F. L. RUDDELL.
PNEUMATIC STACKER.
APPLICATION FILED JULY 15, 1909.
970,956. Patented Sept. 20, 1910.
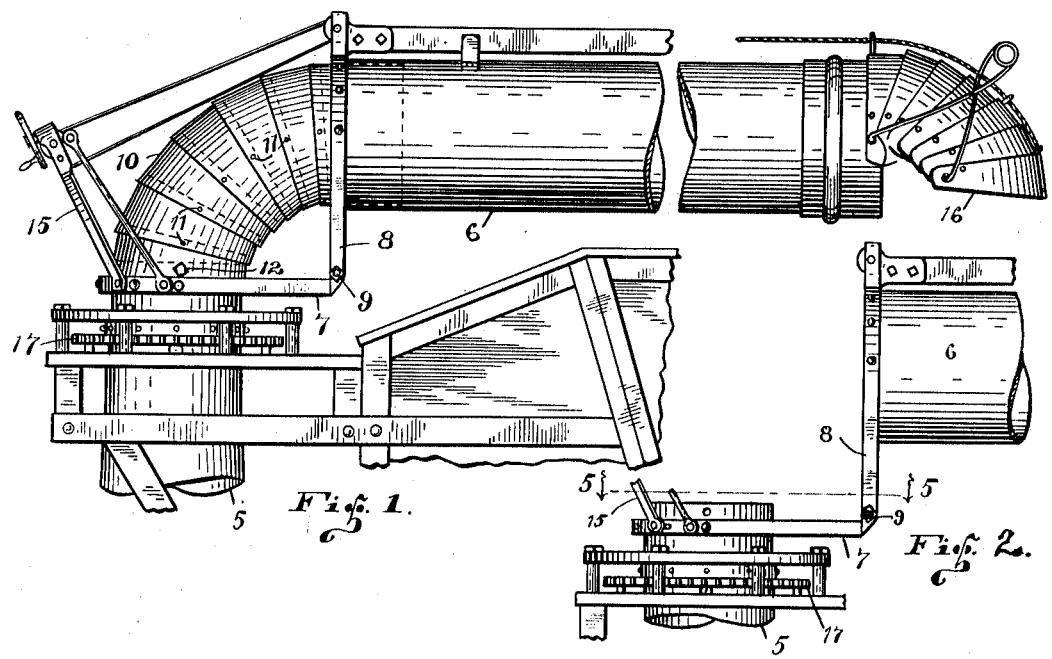
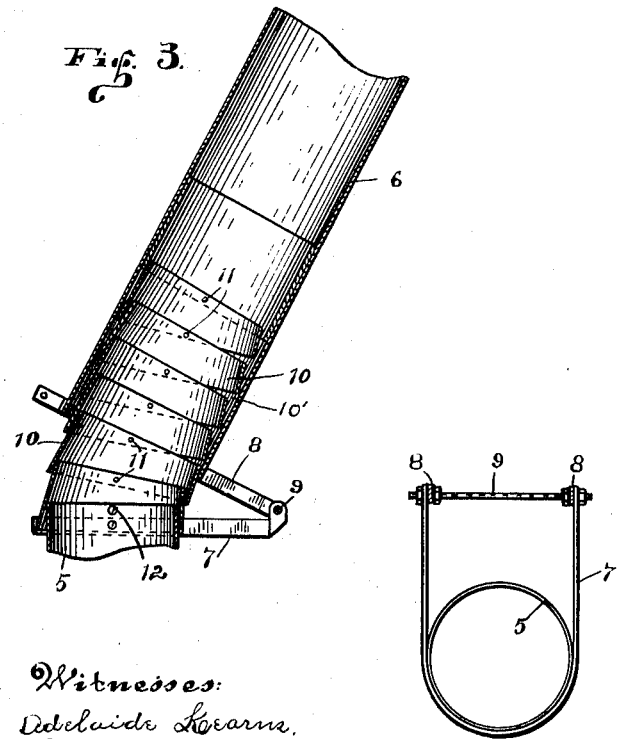
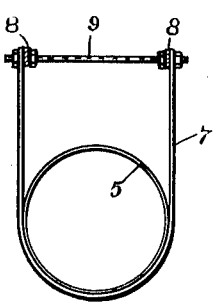
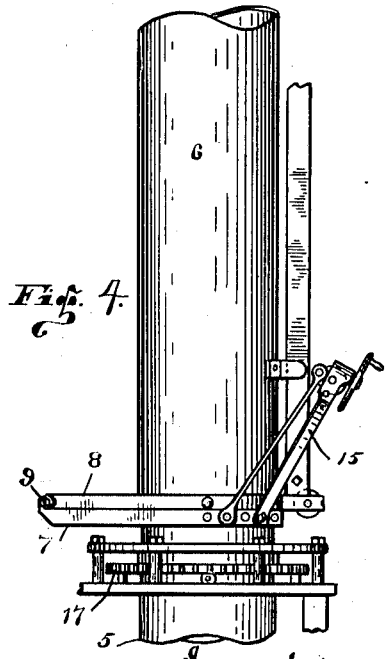

UNITED STATES PATENT OFFICE.

FREDRICK L. RUDDELL, OF GEORGETOWN, ONTARIO, CANADA, ASSIGNOR TO THE INDIANA MANUFACTURING COMPANY, OF INDIANAPOLIS, INDIANA, A CORPORATION OF WEST VIRGINIA.

PNEUMATIC STACKER.

970,956.　　　　　Specification of Letters Patent.　　Patented Sept. 20, 1910.

Application filed July 15, 1909. Serial No. 507,688.

*To all whom it may concern:*

Be it known that I, FREDRICK L. RUDDELL, a subject of the King of Great Britain, residing at Georgetown, in the county of Halton, Province of Ontario, Canada, have invented certain new and useful Improvements in Pneumatic Stackers, of which the following is a specification.

This invention relates to flexible joints or elbows particularly adapted to use in connection with discharge chutes of pneumatic stackers and the like, and my object is to devise an elbow which will not only permit the outer or main chute section to be raised and lowered within a limited range as ordinarily, but also such that the chute may be swung upwardly so as to assume an absolutely vertical position, and the chute and its stump to which it is hinged may thus be brought into complete alinement, constituting substantially a continuous straight pipe or chute. This accomplishment is of material advantage in barn threshing, which permits the operator to discharge straw, etc., from the end of the stacker chute at its highest possible elevation over rafters and other obstructions, which would not be practicable with the limited elevation of stacker chutes commonly employed. This improvement is of further advantage in that when the chute is so elevated it may be rotated, by means of the ordinary turntable upon which it is mounted, so that its discharging end or hood may be pointed in any direction desired to discharge at its extreme height, and by which operation also it may be manipulated to avoid posts and other obstructions in its path when extended and swung in horizontal position in the ordinary manner. I attain these objects by hinging the stump and main chute section together, preferably by securing them to two arms pivotally connected, and by providing the stump with a series of joint sections pivotally connected and adapted as a whole to telescope within the outer section.

In the accompanying drawings, which form a part hereof, Figure 1 is a side elevation of a stacker chute embodying my improved elbow; Fig. 2 a side elevation showing said elbow removed; Fig. 3, a view howing the stump and chute at an obtuse angle to each other; Fig. 4, a side elevation showing the chute in alinement with the stump; and Fig. 5 is a detail showing the manner of hinging the chute sections together.

In said drawings the portions marked 5 indicate a chute section or what is commonly known as the stump, and 6 the outer or main chute section. The chute sections are hinged together, which is preferably accomplished by securing each to a pair of arms, 7, 8, which arms are pivoted together by means of a bolt, 9. The connection between the chute sections 5 and 6 is formed by a series of overlapping sections, 10, which sections are pivotally connected in series by the pivots, 11. The lower joint section in the series is detachably connected to chute section 5 in any suitable manner, a stud and nut, as 12, being indicated, by which arrangement I am enabled to readily remove the elbow in its entirety, as indicated in Fig. 2, and thus have ready access to the chute sections for the removal of clogged material therefrom. The joint section at the outer end of the series is preferably made longer than the others so that it will slide freely without jamming in the chute 6. The intermediate joint sections are necessarily cut to suit the curve of shorter radius to which they must conform at the side nearest the pivotal connection 9, and as their lower portions are much narrower than their upper portions, spaces, as 10', are left between said sections, which spaces gradually increase in dimensions as said elbow is vertically adjusted. By this construction a sufficiently air-tight joint is obtained for all ordinary purposes, as the sections, when in the position shown in Fig. 1, closely fit within one another. As the main chute section 6 is swung vertically to be alined with the chute section or stump 5, by means of the ordinary raising and lowering apparatus, 15, as usual, the joint sections one by one straighten out and telescope into the outer chute section (Fig. 3). With this arrangement the chute sections 5 and 6 may be brought into absolute vertical alinement with one another, as indicated in Fig. 4, which is a result that has not heretofore been attained with stacker chutes or other pipe structures as far as I am aware, and when said hood sections are so alined I may point the mouth of the hood 16 to discharge in any desired direction without manipulating it, by simply rotating the chute by means of turntable 17 in a well known manner. It will also be understood that as the joint sections 10 straighten out within chute 6 gaps are left at the sides nearest the pivotal connection 9 (Fig. 3), but as said chute section effectively covers these spaces no leakage will occur, as clearly indicated by Fig. 4.

I claim as my invention:

1. A pneumatic stacker chute comprising a stump or inner section, an outer section, hinged arms connecting said sections, an elbow connecting said sections comprising a series of pivotally connected overlapping joint sections, the lower end of which elbow is affixed to said inner chute section and the upper end of which is slidably mounted in said outer section, and means for adjusting said outer chute section whereby the same may be telescoped downwardly to incase said elbow and brought into registry perpendicularly with said inner chute section.

2. A pneumatic stacker chute comprising a stump section, an outer section, hinged arms connecting said sections, an elbow detachably connected to said stump section and slidably mounted in said outer section comprising a plurality of overlapping jointed sections imperforate when in curved position and perforate when in substantially straightened position, and means for adjusting said outer chute section to register perpendicularly with said stump section and incase said elbow to prevent lateral escape of air therethrough.

In testimony whereof I affix my signature in presence of two witnesses.

FREDRICK L. RUDDELL.

Witnesses:
N. V. NICKELL,
J. R. NIXON.